Nov. 2, 1965     C. L. KEHR     3,215,556
OXIDIZED POLYETHYLENE COATED CELLULOSIC MATERIALS
Filed June 5, 1962
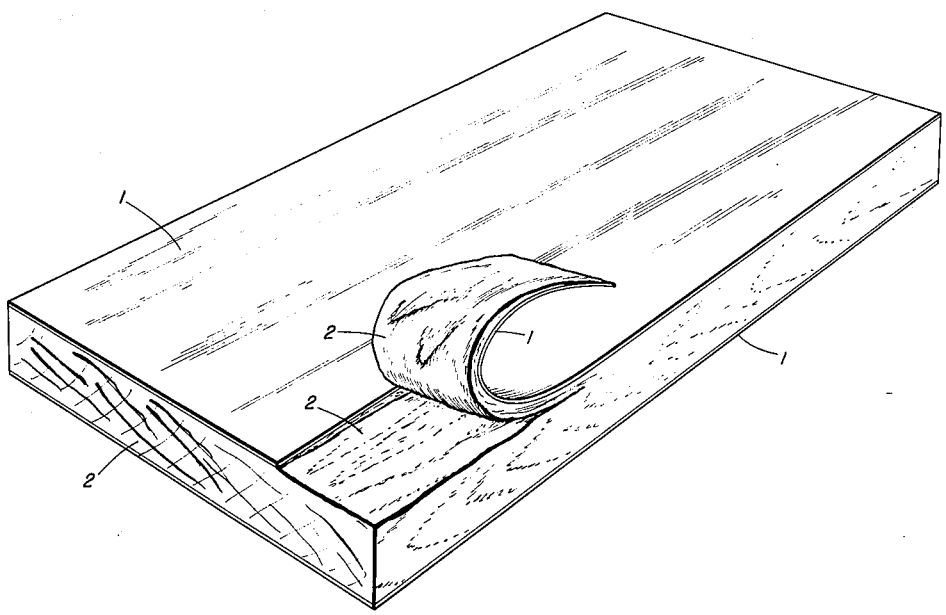
CLIFTON L. KEHR
INVENTOR
BY *Francis H. Deef*
ATTORNEY United States Patent Office 3,215,556
Patented Nov. 2, 1965

3,215,556
OXIDIZED POLYETHYLENE COATED
CELLULOSIC MATERIALS
Clifton L. Kehr, Ednor, Md., assignor to W. R. Grace &
Co., a corporation of Connecticut
Filed June 5, 1962, Ser. No. 200,109
4 Claims. (Cl. 117—143)

This application is a continuation-in-part of Serial No. 147,754, filed Oct. 26, 1961, and now abandoned. The "oxidized polyethylene" employed in the present invention is fully disclosed therein.

The present invention relates to a novel and useful coated product and to a process for producing such a product. More particularly, it relates to a cellulosic product coated with a layer of oxidized polyethylene and to a process for forming such a product.

As is known in the art, polyethylene is a relatively inexpensive and very useful polymer which is utilized in the United States in quantities of hundreds of millions of pounds annually. Processes for producing polyethylene are described, for example, in U.S.P. 2,825,721 and 2,949,447. Polyethylene, however, while it has received widespread acceptance, suffers from certain inherent disadvantages which render it unsuitable for certain applications. For example, the art teaches that polyethylene is unsuitable for coating applications where a tightly adhered coating is required (U.S.P. 2,953,482). Accordingly, various processes have been proposed which require a flame treatment of the polyethylene coating (U.S.P. 2,718,473), a crosslinking of the polyethylene in situ (U.S.P. 2,953,482) or a procedure employing the use of solvents and elevated temperatures (U.S.P. 2,663,-652). Quite obviously, if a relatively inexpensive polyethylene composition could be provided which has good adhesion without the necessity of solvent recovery, crosslinking agents and the like, it would receive widespread acceptance in the field.

It is an object of the present invention to provide a coating material of oxidized polyethylene which gives good adhesion to cellulosic materials. A further object is to provide a cellulosic material which is coated with an oxidized polyethylene. Another object is to provide a wooden surface coated with an oxidized polyethylene which is particularly useful in the formation of concrete forms. A still further object is to provide a cellulosic paper coated with an oxidized polyethylene having improved resistance to tear. A still further object is to provide a process for forming such materials which may be carried out by merely applying the oxidized polyethylene in a softened condition to the cellulosic material. Other objects will become apparent as the description of the invention proceeds.

These objects are accomplished by the present invention which provides an article of manufacture comprising a cellulosic material coated with a layer of an oxidized polyethylene having a density of at least about 0.930, a crystalline melting point of from about 120° C. to about 155° C., a carbonyl content of at least about 0.05% and a melt index of at least about 0.1 with the ratio of the $$\frac{\text{carbonyl content in percent}}{\sqrt{\text{melt index}}}$$

being at least about 0.08.

The present invention also provides a process for preparing a coated cellulosic material which comprises contacting the surface of cellulosic material with a molten oxidized polyethylene having a density of at least about 0.930, a crystalline melting point of from about 120° C. to about 155° C., a carbonyl content of at least about 0.05% and a melt index of at least about 0.1 with the ratio of the $$\frac{\text{carbonyl content in percent}}{\sqrt{\text{melt index}}}$$

being at least about 0.08, and thereafter cooling the cellulosic material to solidifying the oxidized polyethylene.

In a preferred embodiment of the present invention, the oxidized polyethylene has a density of from about 0.930 to about 0.990, a crystalline melting point of from about 125° C. to about 150° C., a carbonyl content of from about 0.05 to about 5.0% and a melt index of from about 0.1 to about 50 and it is used to give a continuous coating to either plywood or paper.

The figure is given to illustrate that the oxidized polyethylene employed in the present invention will not delaminate from the cellulosic material without pulling away portions of the cellulosic materials. In the figure, the layer of oxidized polyethylene 1 when applied to a wooden surface 2 resists delamination to the extent that the fibers from the wood 2 remain attached to the layer of oxidized polyethylene as the layer is pulled away from the wood.

The terminology "cellulosic material" is used to signify a material containing cellulose in its structure. It includes, for example, the common cellulosic materials such as wood, paper, cotton, hemp, regenerated cellulose and the like. While the applicant does not wish to be bound by any theory concerning the type of physical and/or chemical bonding involved, it appears that the oxidized polyethylene has a very strong affinity for materials containing cellulose in their structure and, accordingly, produces a very strong bond which resists delamination.

The terms "coated" and "layer" are used in their broadest sense to include both continuous and discontinuous films or deposits on the surface of the cellulosic material. It includes, for example, materials which contain a smooth, even coating on the surface as well as materials which are only impregnated and thus give a somewhat uneven and discontinuous layer on or in the material. In addition, a cellulosic material such as a regenerated cellulose fiber or a cellulosic batt or felt may be continuously or discontinuously coated with the oxidized polyethylene in accordance with the present invention.

As is pointed out in the parent application, Serial No. 147,754, the oxidized polyethylene is prepared by treating a high molecular weight polyethylene homopolymer or copolymer of substantially 0.0 (i.e. less than 0.01) melt index with an oxygen containing vapor at a temperature in the range of 100–138° C., until the high molecular weight polyethylene is oxidatively degraded to a product having a melt index of at least 0.1. As starting materials for the oxidation, one may employ the polyethylene homopolymer or the various copolymers obtained for reacting ethylene with a comonomer such as propylene, butane-1, 3-methyl butene-1, 1,3-butadiene and the like, as well as mixtures of such comonomers, as described in U.S.P. 2,825,721 and 2,949,447. The process by which the polyethylene is oxidized is not critical. For example, the polyethylene can be milled in air at a temperature in the range of 140–200° C. Still another method is to suspend particles of the polyethylene in water, or an organic solvent, and bubble air through the suspension. Yet another method is to pass air at a temperature in the range of 100–138° C. through a fluidized bed of polyethylene particles. Accelerators such as ultraviolet light can be used. The process of oxidation, however, must be controlled so as to degrade the polyethylene down to, put not beyond, a useful molecular weight.

The oxidative process can be quenched at any desired level of oxidation by any suitable means as, for example, by adding a suitable antioxidant, such as N-phenyl-2-naphthylamine. Another method of quenching is to quickly cool the oxidized product to room temperature.

In general, the invention is operable where the oxidized polyethylene has a density of at least 0.930, a crystalline melting point of from about 120° C. to about 155° C., a carbonyl content of at least about 0.05% and a melt index of at least about 0.1 with the ratio of the $$\frac{\text{Carbonyl content in percent}}{\sqrt{\text{melt index}}}$$

being at least about 0.08. In measuring the polymer properties, it is permissible to include minor amounts (i.e. 0.05% or even more) of a stabilizer in the polymer composition during measurement as such small amounts do not affect the measured values or give negligible variations from the true values.

The following examples are given to illustrate the invention and are not intended to limit it in any manner. All parts are given in parts by weight unless otherwise expressed.

The extent of oxidation of the polyethylene is determined by ascertaining the carbonyl content of the polymer by infrared analysis using the peak at 1720 cm.$^{-1}$. By the word "carbonyl" is meant primarily ketone and aldehyde groups. A Perkin Elmer spectrophotometer, model 221, is used. The reported percent carbonyl is equal to $$\frac{\text{gms. C=O}}{\text{gm. polymer}} \times 100$$

Melt indices (MI) are measured under the conditions specified in ASTM–D–1238–52T.

Densities of the polymer are measured under the conditions specified in ASTM–D–1505–57T.

The crystalline melting point is determined by the conventional procedure employing a polarizing microscope.

Reduced specific viscosity, RSV, is obtained by dissolving 0.1 g. of the polymer in 100 cc. Decalin at 135° C. in accord with the procedure of ASTM–D–1601–58T.

*Example 1*

500 g. of commercially available linear polyethylene in particle form having a melt index of 0.00, a melting point of 130° C., a density of 0.937 and a reduced specific viscosity (RSV) of 9.3 is blended in a Patterson-Kelley Twin Shell Blender with about 100 cc. of a benzene solution containing 0.5% benzoyl peroxide, based on the weight of the polymer, for 30 minutes at room temperature. The benzene is evaporated and the polymer is transfererd to a circulating air oven maintained at a temperature of 128° C. After 2½ hours the polymer is removed from the oven and stabilized above its melting point with 0.5% by weight of 4,4-thiobis(6-t-butylmetacresol). The stabilized polyethylene on characterization has a carbonyl content of 0.5%, as measured by infrared analysis, a density of 0.960, a crystalline melting point of 135° C. and a melt index of 0.2.

A commercial plywood (3 ply) plaque 9" x 9" is placed in a press heated to 300° F. and covered with 40 grams of the oxidized polyethylene polymer powder. Poly-(ethylene terephthalate) sheets are placed next to each platen of the press (to prevent sticking) and the resulting "sandwich" preheated for 2 minutes without pressure. A pressure of 20–22 tons is then applied to the plaque for 5 minutes. After the 5 minutes, the plywood is turned over in the press and pressed for another 5 minutes at 20–22 tons. The plaques are removed from the press and cooled to room temperature. The poly(ethylene terephthalate) sheets are peeled from the plywood.

The plywood plaque is evenly coated with the oxidized polyethylene which gives the plaque a lustrous coating. The coating is approximately 15–20 mils in thickness and the coating will not peel from the plaque. Attempts to delaminate the plaque result in the tearing apart of the wood fibers of the first ply of the plywood and the coating upon such delamination is completely covered with the wood fibers.

*Example 2*

500 g. of commercially available linear polyethylene in particle form having a melt index of 0.00, a melting point of 130° C., a density of 0.937 and a reduced specific viscosity (RSV) of 9.3 is blended in a Patterson-Kelley Twin Shell Blender with about 100 cc. of a benzene solution containing 0.5% benzoyl peroxide, based on the weight of the polymer, for 30 minutes at room temperature. The benzene is evaporated and the polymer is transferred to a circulating air oven maintained at a temperature of 128° C. After 4 hours the polymer is removed from the oven and stabilized above its melting point with 5% by weight of 4,4-thiobis(6-t-butylmetacresol). The stabilized polyethylene on characterization has a carbonyl content of 0.7%, as measured by infrared analysis, a density of 0.960, a crystalline melting point of 135° C. and a melt index of 0.5.

A commercial plywood (3 ply) plaque 9" x 9" is placed in a press heated to 300° F. and covered with 40 grams of the oxidized polyethylene polymer powder. Poly(ethylene terephthalate) sheets are placed next to each platen of the press and the resulting "sandwich" preheated for 12 minutes without pressure. A pressure of 20–22 tons is then applied to the plaque for 5 minutes. The plaques are removed from the press and cooled to room temperature. The poly(ethylene terephthalate) sheets are peeled from the plywood.

The plywood plaque is evenly coated with the oxidized polyethylene which gives the plaque a lustrous coating. The coating is approximately 10–15 mils in thickness and the coating will not peel from the plaque. Attempts to delaminate the plaque result in the tearing apart of the wood fibers of the first ply of the plywood and the coating upon delamination is completely covered with the wood fibers.

*Example 3*

500 g. of commercially available linear polyethylene in particle form having a melt index of 0.00, a melting point of 135° C., a density of 0.954 and a reduced specific viscosity (RSV) of 4.5 is blended in a Patterson-Kelley Twin Shell Blender with about 100 cc. of a benzene solution containing 0.5% benzoyl peroxide, based on the weight of the polymer, for 30 minutes at room temperature. The benzene is evaporated and the polymer is transferred to a circulating air oven maintained at a temperature of 128° C. After 24 hours the polymer is removed from the oven and stabilized above its melting point with 0.5% by weight of 4,4-thiobis(6-t-butylmetacresol). The stabilized polyethylene on characterization has a carbonyl content of 3.0%, as measured by infrared analysis, a density of 0.980, a crystalline melting point of 130° C. and a melt index of 400.

A commercial plywood (3 ply) plaque 9" x 9" is placed in a press heated to 320° F. and covered with 40 grams of the oxidized polyethylene polymer powder. Poly(ethylene terephthalate) sheets are placed next to each platen of the press and the resulting "sandwich" preheated to 2–3 minutes without pressure. A pressure of 22 tons is then applied to the plaques for 5 minutes. After the 5 minutes, the plywood is turned over in the press and pressed for another 5 minutes at 22 tons pressure. The plaque is removed from the press and cooled to room temperature. The poly(ethylene terephthalate) sheets are peeled from the plywood.

The plywood plaque is evenly coated with the oxidized polyethylene which gives the plaque a quite lustrous coating. The coating is approximately 10–15 mils in thickness and the coating will not peel from the plaque. The coating, however, is quite brittle and when chipped from the plaque leaves a residual impregnated area on the plywood.

*Example 4*

The oxidized polyethylene of Example 2 is heated and pressed into a sheet having a thickness of about 20 mils. A 2 inch square sample of the sheet is placed on a 2 inch square sample of bleached white paper having a thickness of about 30 mils. The paper and sheet are then sandwiched between 2 sheets of poly(ethylene terephthalate) and placed in a heated press for 2 minutes at 280° F. under a pressure of 1,000 pounds. The sheets are removed from the press and cooled to room temperature.

The oxidized polyethylene polymer penetrates the paper to a depth of several mils in thickness and the coating cannot be removed without delamination of the paper sheet. The coating is even and it gives a product which is very resistant to tear.

While in the above examples the invention has been demonstrated with reference to the specified cellulosic materials, wood and paper, it is obvious that other materials such as batts, felts, regenerated cellulose filaments and the like, may be employed in the practice of the present invention. Obviously, the coating may be any thickness depending on the end use of the product. Preferably, however, the coating is less than 0.1 inch in thickness and more preferably less than 0.05 inch. Also, while the oxidized polyethylene is particularly useful as a surface coating, it can likewise be employed in the formation of laminates between the same or different cellulosic materials in which case the coating is very thin being generally less than 0.05 inch.

In preparing the coated cellulosic materials of the present invention, it is preferred that pressure be employed so as to give good penetration of the polymer into the material, although pressure is by no means necessary. In general, pressures of at least about 20 p.s.i. are employed with the preferred lower melt index (i.e. 0.1 to about 50) materials. However, with the oxidized polyethylenes having a higher melt index, and particularly those ranging from 500 to 2,000, substantially no pressure or only a very light pressure is employed unless deep penetration is desired.

The resulting coated cellulosic materials can be used directly or further fabricated into other useful articles. For example, the coated wood, and particularly plywood, is particularly adapted for fabrication into concrete forms to prevent the concrete from adhering to the wooden surface and also to prevent moisture penetration which might warp the plywood. The coated papers of the present invention are useful as wrapping materials, shelving materials and the like. Batts, pellicles, felts and the other like materials of the present invention are useful for sound and heat insulation, packaging and other such similar uses.

While in the examples unmodified compositions are produced, it is obvious that other materials such as dyes, pigments, fibers and other polymers may be introduced into the oxidized polyethylene without substantial alteration of the physical properties of the coated structures produced.

Many equivalent modifications will become apparent to those skilled in the art from a reading of the foregoing with a departure from the inventive concept.

What is claimed is:

1. An article of manufacture comprising a cellulosic material coated with a strongly adherent layer consisting essentially of an oxidized polyethylene having a density of from about 0.930 to about 0.990, a crystalline melting point of from about 125° C. to about 150° C., a carbonyl conent of from about 0.05 to about 5.0% and a melt index of from about 0.1 to about 50 with the ratio of the $$\frac{\text{carbonyl content in percent}}{\sqrt{\text{melt index}}}$$

being at least about 0.08.

2. The article of manufacture of claim 1 wherein the cellulosic material is wood.

3. The article of manufacture of claim 1 wherein the cellulosic material is plywood.

4. The article of manufacture of claim 1 wherein the cellulosic material is paper.

References Cited by the Examiner

UNITED STATES PATENTS

| | | | |
|---|---|---|---|
| 3,076,720 | 2/63 | Rice et al. | 117—46 X |
| 3,103,459 | 9/63 | Kane | 117—161 X |

OTHER REFERENCES

Renfrew et al.: Polythene, New York, Interscience, 1957, pp. 267, 397–399.

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,215,556 November 2, 1965

Clifton L. Kehr

It is hereby certified that error appears in the above numbered patent requiring correction and that the said Letters Patent should read as corrected below.

Column 4, line 18, for "5%" read -- 0.5% --.

Signed and sealed this 3rd day of January 1967.

(SEAL)
Attest:

ERNEST W. SWIDER
Attesting Officer

EDWARD J. BRENNER
Commissioner of Patents